3,660,437
PROCESS FOR PREPARING 9α-UNSUBSTITUTED 11β-CHLORO - 19-NOR STEROIDS OF THE ANDROSTANE OR PREGNANE SERIES

Leslie Stephenson and Margaret Elizabeth Hill, London, England, assignors to Glaxo Laboratories, Limited
No Drawing. Filed Jan. 15, 1970, Ser. No. 3,205
Claims priority, application Great Britain, Jan. 23, 1969, 3,971/69
Int. Cl. C07c 169/20, 169/18, 169/30
U.S. Cl. 260—397.45      20 Claims

ABSTRACT OF THE DISCLOSURE

Process for preparing 9α-unsubstituted 11β-chloro-19-nor steroids of the androstane or pregnane series by reacting the corresponding 11α-hydroxy-19-nor steroid in an inert solvent with a source of positive chlorine, an anhydrous form of sulphur dioxide being present or added subsequently.

---

The present invention relates to a process for the preparation of chlorine-substituted steroids.

Introduction of an 11β-chloro-substituent into 9α-unsubstituted-19-nor-steroids has been found to provide compounds which possess valuable hormonal activity.

We have found that 9α-unsubstituted 11β-chloro-19-nor steroids may be produced by reacting a corresponding 11α-hydroxy-steroid in an inert solvent with a source of positive chlorine, an anhydrous form of sulphur dioxide being present or added subsequently, whereby an 11β-chloro-steroid is formed. This new reaction has the advantage of producing the desired 11β-chloro steroids in good yield often superior to that using previously described processes, while employing relatively inexpensive reagents.

While we do not wish to be bound by theoretical considerations, it is believed that the initial reaction of the reagent providing positive chlorine is to convert the 11α-hydroxy group to an 11α-hypochlorite group. The sulphur dioxide reagent then reacts with the hypochlorite to produce an 11α-chlorosulphonate group and rearrangement by a mechanism producing inversion at the 11-position, for example an $S_N2$ reaction with negative chloride ions liberated by decomposition of the chlorosulphonate group, or an intramolecular rearrangement of the latter group, replaces the 11α-chlorosulphonate group by an 11β-chlorine atom. Where a base is present it is also possible for the 11α-hypochlorite group to rearrange to produce an 11-keto group or for the 11-chlorosulphonate group to eliminate with the 9α-hydrogen atom to yield a $\Delta^{9,11}$-steroid. The fact that we have not found the latter reactions to take place in the 19-nor series of steroids is surprising since they have been reported for steroids having a 19-carbon substituent.

The 11α-hydroxy steroid starting materials can carry various ring substituents for example in the 17-position a hydroxyl group, a protected hydroxyl group, an oxo group, or a protected oxo group, or an aliphatic, araliphatic, acyl, in particular acetyl, or acyloxyacyl group in the presence or absence of a hydroxyl or protected hydroxyl group; in the 16-position a methyl, methylene or methoxy group; in the 6-position a chlorine or fluorine atom or a methyl group; in the 3-position an oxo, protected oxo, hydroxyl or protected hydroxyl group. By the terms "protected hydroxyl group" and "protected oxo group" we mean such groups as acyloxy, ether, enolether or ketal groups which can be re-converted into hydroxyl or oxo groups. Alternatively, such protected groups may be required in the end product and may be allowed to remain. The steroids may possess double bonds; for example, the A-ring may be fully aromatic or there may be double bonds in one or more of the 1,2-, 3,4-, 4,5-, 5,6-, 6,7- and 16,17-positions.

Where acyloxy groups are present these may be substituted or unsubstituted aliphatic, cycloaliphatic, araliphatic or aryl acyloxy groups, for example acetoxy, propionyloxy, valeryloxy, hexahydrobenzoyloxy, β-phenylpropionyloxy or benzoyloxy groups.

Other protected hydroxyl groups include ethers, e.g. alkoxy groups having 1–5 carbon atoms, or aralkoxy or aryloxy groups, especially arylmethoxy groups such as benzyloxy groups. Protected oxo groups include ketal groups, e.g. ethylenedioxy groups and enol ether groups such as enol methyl ether groups or enol ethyl ether groups.

The aliphatic groups which may be present in the 17-position preferably contain 1–9 carbon atoms and may, for example, be substituted or contain unsaturation. Substituents which may be present include for example, halogen atoms (e.g. chlorine) or hydroxy or acyloxy groups. Useful aliphatic substituents thus include methyl, ethyl, propyl, vinyl, 2-methyl-prop-2-enyl, 1-methyl-prop-2-enyl, but-2-enyl, allyl, ethynyl, chloroethynyl groups etc.

As source of positive chlorine it is advantageous to use a cyclic or acyclic N-chloro-amide, -imide or -hydantoin, for example N-chloroacetamide, N-chloro- or N,N-dichlorodimethylhydantoin or, for preference, N-chloro-succinimide.

Other sources of positive chlorine include elemental chlorine and tertiary alkyl hypochlorites.

The reaction is advantageously effected under anhydrous conditions (since water reacts with the hypochlorite intermediate to regenerate the 11α-hydroxy group), preferably in the absence of light. The solvent should be inert to the reaction conditions, and thus should be unreactive with the source of positive chlorine or with the sulphur dioxide. Suitable solvents thus include aromatic and saturated aliphatic hydrocarbons, halogenated hydrocarbons, ethers, substituted amide solvents, and tertiary amines, especially those in which the nitrogen atoms form part of an aromatic ring. Examples of such solvents include benzene, toluene, chlorobenzene, methylene chloride, pentane, hexane, cyclohexane, dioxan, tetrahydrofuran, diethyl ether, diethylene glycol dimethyl ether, dimethyl acetamide, dimethyl formanmide, and quinoline, collidine and pyridine. The sulphur dioxide may be bubbled into the reaction mixture as a dry gas or alternatively liquid sulphur dioxide may be added or a material which, in situ produces sulphur dioxide, e.g. an alkali metal hyposulphite.

The reaction with the source of positive chlorine is preferably effected before addition of the anhydrous sulphur dioxide. Thus the 11α-hydroxy steroid may be reacted with N-chlorosuccinimide and sulphur dioxide subsequently bubbled into the reaction mixture. Alternatively both reagents may be added together. Thus, for example, the steroid may be added to a mixture of N-chlorosuccinimide and sulphur dioxide in an inert solvent, the reaction between the two reagents being much slower than the reaction according to the invention.

It is advantageous to use an excess of the source of positive chlorine, preferably at least a one molar excess. The quantity of sulphur dioxide used is then regulated to be in excess of that required not only to react with all hypochlorite groups but also with any excess oxidising agent present, such as an excess of N-chlorosuccinimide. In practice, the sulphur dioxide is conveniently added until a negative test is obtained with acidified starch/potassium iodide paper.

After reaction with sulphur dioxide the reaction mixture is most advantageously worked up by addition of an ionising solvent, preferably water. Other hydroxylic compounds may however be used for example alcohols, such as methanol or ethanol, or substituted amides such as dimethyl formamide or dimethylacetamide.

The reaction with the source of positive chlorine and the reaction with sulphur dioxide are preferably effected at a low or moderate temperature, for example within a temperature range of —40° to +50° C. The lower limit will be determined by the solubility of the reactants and/or the melting point of the solvent and the length of the reaction time; the upper limit will be determined by the amount of side reactions occuring. Advantageously the reaction temperature is between 10° C. and 40° C.

The time taken for the reactions will, of course, depend on the reaction temperature. In view of the possible reactions of the 11α-hypochlorite group, it is preferred to add the sulphur dioxide at an early stage and, in general, not later than the end of the reaction with the chlorinating reagent. The optimal times and temperatures are best determined by experimentation.

In order that the present invention may be easily understood, the following examples are provided by way of illustration only; all temperatures are in ° C.:

EXAMPLE 1

11β-chloro-17α-hydroxy-19-norpregn-4-ene-3,20-dione

11α,17α - dihydroxy - 19 - norpregn-4-ene-3,20-dione (0.664 g., 2 mmole) in dry pyridine (10 ml.) was treated with N-chlorosuccinimide (0.35 g., 2.6 mmole) at 15° under nitrogen in the absence of light. After 45 minutes the mixture was cooled to 10° C. and treated with sulphur dioxide until there was no reaction with acidified potassium iodide paper. Water was added slowly and the solid (0.25 g.) was collected by filtration. Crystallisation from methyl acetate/petroleum ether (B.P. 60–80°) gave the title compound (0.209 g., 25%), M.P. 190–193°, $\lambda_{max}$ (ethanol) 238 nm. ($\epsilon$ 17,250).

EXAMPLE 2

11β-chloro-17α-hydroxy-19-norpregn-4-ene-3,20-dione

11α,17α-dihydroxy-19-norpregn-3,20-dione (0.664 g., 2 mmole) in dry pyridine (10 ml.) was treated with 1,3-dichloro-5,5-dimethyl hydantoin (0.512 g., 2.6 mmole) under nitrogen in the absence of light. After 45 minutes the mixture was cooled to 10° and treated with sulphur dioxide until there was no reaction with acidified starch iodide paper. Water was added slowly, maintaining the temperature below 30°, and the solid (0.436 g.) was collected by filtration. Purification by preparative layer chromatography gave the title compound (0.13 g., 19%) with an $R_f$ of 0.35 (on silica run in ethyl acetate/petroleum ether, B.P. 60–80°) identical to the product of Example 1.

EXAMPLE 3

11β-chloro-19-norpregn-4-ene-3,20-dione

11α - hydroxy-19-norpregn-4-ene-3,20-dione (0.316 g., 1 mmole) in dry pyridine (5 ml.) was treated at 15° with N-chloro-succinimide (0.175 g., 1.3 mmole), under nitrogen and in the absence of light. After 45 minutes the mixture was cooled to 10° and treated with sulphur dioxide until there was no reaction with acidified starch iodide paper. Water was added slowly maintaining the temperature below 30° and the solid (0.145 g.) was collected by filtration. Crystallisation from methyl acetate/ petroleum ether (B.P. 60–80°) gave the title compound (0.093 g., 27.8%), M.P. 120–122°, $[\alpha]_D + 199°$ (c. 0.8 in chloroform), $\lambda_{max}$ (ethanol) 238 nm. ($\epsilon$ 16,300).

EXAMPLE 4

11β-chloro-17α-hydroxy-19-norpregn-4,6-diene-3,20-dione

11α,17α-dihydroxy-19-norpregna-4,6-diene-3,20 - dione (0.330 g., 1 mmole) in dry pyridine (5 ml.) was treated at 15° with N-chlorosuccinimide (0.175 g., 1.3 mmole) under nitrogen and in the absence of light. After 45 minutes the mixture was cooled to 10° and treated with sulphur dioxide until there was no reaction with acidified starch iodide paper. Water was added slowly, maintaining the temperature below 30° and the solid (0.105 g.) was collected by filtration. Crystallisation from methyl acetate gave the title compound (0.065 g., 18.6%), M.P. 216–219°, $[\alpha]_D + 146°$ (c. 0.5, chloroform), $\lambda_{max}$ (ethanol) 280 nm. ($\epsilon$ 26,500). This compound has not previously been described in the literature. It possesses hormonal activity and additionally serves as an intermediate in the production of the corresponding 17α-esters which have marked progestational activity.

EXAMPLE 5

11β-chloro-oestr-4-ene-3,17-dione

11α-hydroxy-oestr - 4 - ene - 3,17 - dione (0.576 g., 2 mmole) in dry pyridine (10 ml.) was treated at 15° with N-chlorosuccinimide (0.35 g., 2.6 mmole) under nitrogen and in the absence of light. After 45 minutes the mixture was cooled to 10° and treated with sulphur dioxide until there was no reaction with acidified starch iodide paper. Water was added slowly maintaining the temperature below 30° and the solid (0.480 g.) was collected by filtration. Crystallisation from methyl acetate gave the title compound (0.353 g., 57.6%), M.P. 176–178°, $[\alpha]_D + 201°$ (C. 1.0, chloroform), $\lambda_{max}$ (ethanol) 237.5 nm. ($\epsilon$ 16,550).

EXAMPLE 6

11β-chloro-17α-hydroxy-19-norpregn-4-ene-3,20-dione

11α,17α-dihydroxy-19-norpregn-4-ene-3,20-dione (0.664 g., 2 mmole) in dry pyridine (10 ml.) was treated at 15° with N-chlorosuccinimide (0.35 g., 2.6 mmole) under nitrogen and in the absence of light. After 45 minutes anhydrous lithium chloride (0.66 g.) was added. The mixture was cooled to 10° and treated with sulphur dioxide until there was no reaction with acidified starch iodide paper. Water was added slowly maintaining the temperature below 30° and the solid (0.28 g., 40%) was collected by filtration giving the title compound with $R_f$ of 0.35 (on silica run in ethyl acetate/petroleum ether, B.P. 60–80°) identical to the product of Example 1.

We claim:

1. A process for the preparation of a 9α-unsubstituted 11β-chloro-19-nor steroid of the androstane or pregnane series in which a corresponding 11α-hydroxy-19-nor steroid is reacted in an inert solvent with a source of positive chlorine, an anhydrous form of sulphur dioxide being present or added subsequently, whereby an 11β-chloro-19-nor steroid is formed.

2. A process as claimed in claim 1 in which the source of positive chlorine is a cyclic or acyclic N-chloroamide, -imide or -hydantoin.

3. A process as claimed in claim 2 in which the source of positive chlorine is N-chloroacetamide, N-chloro- or N,N-dichlorodimethyl hydantoin or N-chlorosuccinimide.

4. A process as claimed in claim 1 in which the reaction is effected under anhydrous conditions.

5. A process as claimed in claim 4 in which the reaction is effected in the absence of light.

6. A process as claimed in claim 1 in which the inert solvent comprises a tertiary amine in which the nitrogen atom forms part of an aromatic ring.

7. A process as claimed in claim 6 in which the solvent comprises pyridine.

8. A process as claimed in claim 1 in which the sulphur dioxide is bubbled into the reaction mixture as a dry gas.

9. A process as claimed in claim 1 in which liquid sulphur or a material which in situ produces sulphur dioxide is added to the reaction mixture.

10. A process as claimed in claim 9 in which the material producing sulphur dioxide in situ is an alkali metal hyposulphite.

11. A process as claimed in claim 1 in which the source of positive chlorine is used in excess.

12. A process as claimed in claim 1 in which the reaction mixture is worked up by addition of an ionising solvent.

13. A process as claimed in claim 1 in which the reaction is effected at a temperature from $-40°$ to $+50°$ C.

14. A process as claimed in claim 13 in which the temperature is from $10°$ to $40°$ C.

15. A process as claimed in claim 1 in which the $11\alpha$-hydroxy starting material carries one or more of the following ring substituents: in the 17-position a hydroxyl group, a protected hydroxyl group, an oxo group, or a protected oxo group, or an aliphatic, araliphatic, acyl or acyloxacyl group in the presence or absence of a hydroxyl or protected hydroxyl group; in the 16-position a methyl, methylene or methoxy group; in the 6-position a chlorine or fluorine atom or a methyl group; in the 3-position an oxo, protected oxo, hydroxyl or protected hydroxyl group; and/or possesses double bonds.

16. A process as claimed in claim 15 in which the starting materials possess an aromatic A-ring or possess double bonds in one or more of the 1,2-, 3,4-, 5,6-, 6,7- and 16,17-positions.

17. A process as claimed in claim 15 in which an aliphatic group at the 17-position contains 1–9 carbon atoms and is saturated or unsaturated.

18. A process as claimed in claim 17 in which the aliphatic group at the 17-position carries as a substituent a halogen atom or a hydroxy or acyloxy group.

19. A process as claimed in claim 15 in which the 17-position carries a $\beta$-acetyl group.

20. $11\beta$-chloro-$17\alpha$-hydroxy-19-nor-pregna-4,6-diene-3,20-dione.

No references cited.

ELBERT L. ROBERTS, Primary Examiner

U.S. Cl. X.R.

260—397.3